US008762043B2

(12) United States Patent
Eidehall et al.

(10) Patent No.: US 8,762,043 B2
(45) Date of Patent: Jun. 24, 2014

(54) METHOD AND SYSTEM FOR COLLISION COURSE PREDICTION AND COLLISION AVOIDANCE AND MITIGATION

(75) Inventors: Andreas Eidehall, Göteborg (SE); Claes Olsson, Gothenburg (SE); Jochen Pohl, Grimstad (DE)

(73) Assignee: Volvo Car Corporation, Gothenburg (SE)

( * ) Notice: Subject to any disclaimer, the term of this patent is extended or adjusted under 35 U.S.C. 154(b) by 1187 days.

(21) Appl. No.: 12/360,618

(22) Filed: Jan. 27, 2009

(65) Prior Publication Data
US 2009/0192710 A1    Jul. 30, 2009

(30) Foreign Application Priority Data
Jan. 29, 2008  (EP) ..................................... 08150782

(51) Int. Cl.
G01C 21/00 (2006.01)
B62D 15/02 (2006.01)
B60W 30/08 (2012.01)

(52) U.S. Cl.
CPC ............ *B62D 15/0265* (2013.01); *B60W 30/08* (2013.01); *B60W 2550/304* (2013.01); *B60W 2550/306* (2013.01); *B60W 2550/302* (2013.01); *B60W 2550/308* (2013.01)
USPC .......................................... 701/301; 701/302

(58) Field of Classification Search
USPC ......................................................... 701/200
See application file for complete search history.

(56) References Cited

U.S. PATENT DOCUMENTS

| | | | | |
|---|---|---|---|---|
| 5,018,689 A | * | 5/1991 | Yasunobu et al. | ........ 246/182 B |
| 6,487,500 B2 | * | 11/2002 | Lemelson et al. | ............ 701/301 |
| 6,873,286 B2 | | 3/2005 | Albero et al. | |
| 7,034,668 B2 | | 4/2006 | Engelman et al. | |
| 2003/0106732 A1 | | 6/2003 | Watanabe et al. | |
| 2004/0199327 A1 | * | 10/2004 | Isogai et al. | .................. 701/301 |
| 2006/0217866 A1 | | 9/2006 | Moebus | |
| 2007/0150196 A1 | | 6/2007 | Grimm | |
| 2008/0140292 A1 | * | 6/2008 | Suzuki et al. | ................... 701/70 |

FOREIGN PATENT DOCUMENTS

| | | |
|---|---|---|
| EP | 1 661 751 | 1/2008 |
| WO | 2005037592 | 4/2005 |

OTHER PUBLICATIONS

European Search Report for the corresponding European Patent Application No. 08150782.4-2421 mailed Jul. 18, 2008.
Kermit Whitfield, "A hitchhiker's guide to the telematics ecosystem", Automotive Design & Production, Oct. 2003, http://findarticles.com, pp. 1-3.

* cited by examiner

*Primary Examiner* — Valerie Lubin
*Assistant Examiner* — Reginald R Reyes
(74) *Attorney, Agent, or Firm* — Brooks Kushman P.C.

(57) ABSTRACT

A system for collision course prediction includes a host vehicle sensor system detecting information relating to a target object including a position and a velocity relative to the host vehicle; a time-to-collision estimator control block calculating an estimated time-to-collision based on a longitudinal distance, longitudinal velocity and longitudinal acceleration of the target object relative to the host vehicle; a lateral distance estimator control block, which estimates the lateral distance between the centers of the host vehicle and target object at the estimated time-to-collision; and a collision course condition determination unit determining, at a determination instant prior to the estimated time-to-collision, a probability that the host vehicle will collide with the target object dependent at least in part upon whether the lateral distance is within a first interval, the first interval based on at least a lateral width of the host vehicle and a lateral width of the target object.

8 Claims, 11 Drawing Sheets

METHOD AND SYSTEM FOR COLLISION COURSE PREDICTION AND COLLISION AVOIDANCE AND MITIGATION

CROSS-REFERENCE TO RELATED APPLICATION

This application claims foreign priority benefits under 35 U.S.C. §119(a)-(d) to EP 08150782.4 filed Jan. 29, 2008, where is hereby incorporated by reference it its entirety.

TECHNICAL FIELD

The invention relates to a system for collision course prediction that detects the relative movement between a host vehicle and a target vehicle and determines whether the target vehicle will collide with the host vehicle or not. The invention also relates to a collision avoidance and mitigation system which assesses the risk that a host vehicle will leave a current lane and enter into a neighboring lane and generates an intervention in the event the risk is sufficiently high.

BACKGROUND ART

In recent years, safety has been improved by employing active safety devices, for example, various types of air-bags. More recently, there has been interest for intelligent sensor safety systems for inclusion in automobiles, such intelligent sensor safety systems being operable to sense road conditions external to such automobiles and to apply automatically crash avoidance or crash mitigation measures when potential collision events are identified.

It is envisaged that automobile manufacturer may in the future provide vehicles with forward collision warning (FCW) and forward collision mitigation (FCM) systems. Such FCW and FCM systems may employ microwave radar or lidar sensors to measure distances and velocities of vehicles or similar types of object which could represent crash threats. Moreover, such systems are expected to include computing hardware operable to execute decision algorithms for determining whether or not (or a probability that) a vehicle or object represents a threat and initiate autonomous braking when appropriate. Sensor arrangements such as electro-optical sensors and wide-angle radars in combination with electric power assisted steering (EPAS) and associated data processing systems are capable of potentially providing collision avoidance by autonomous steering intervention. Algorithms for executing decisions regarding steering may also be developed, but these are anticipated to be more complex than corresponding algorithms for executing autonomous braking. Moreover, it is envisaged that a maximum steering force applied in autonomous crash avoidance will not be limited by physical vehicle characteristics but defined by customer requirements or legal regulations.

U.S. Pat. No. 6,873,286 describes a motor vehicle driving aid system. The system comprises detector devices operable to provide electrical signals indicative of a relative distance and relative speed of a motor vehicle with respect to a fixed or moving obstacle ahead thereof. The system further includes a processing and control unit coupled to the detector devices to receive detection signals there from, and also connected to brake actuators for outputting braking instructions thereto. In operation, the processing and control unit is arranged to activate the brake actuators to apply automatic emergency braking to the motor vehicle when the relative distance $d_R$ between the motor vehicle and an obstacle present ahead of the vehicle lies between a first predetermined limit value $d_F$ and a preselected intermediate value $d_E$. The first value $d_F$ corresponds to a minimum distance at which it is still possible to avoid a collision by braking.

The distance $d_E$ also represents a distance wherein, when less than the value $d_F$, it is no longer possible to avoid a collision event of the motor vehicle only by braking, thus requiring a lateral obstacle avoidance maneuver to be performed. Actuation of an obstacle avoidance maneuver is controlled in the motor vehicle by a steering actuator, for example an electric motor, coupled to a steering column of the vehicle; the steering actuator is controlled from a steering control unit. The control unit is operable to activate an obstacle avoidance function in an event that invoking the function is capable of avoiding a collision event from occurring.

The driving aid system is described as including a frontal microwave radar apparatus for sensing an obstacle in a path of travel of the vehicle. The microwave radar is arranged to perform a scanning function and, in particular, to generate a signal indicative of a relative speed $V_R$ and the relative distance $d_R$ between the motor vehicle and a potential object ahead thereof. The driving aid system also includes at least one video or electro-optical sensor directed to an area ahead of the motor vehicle, and a series of lateral short-range radar systems and a pair of video or electro-optical sensors for monitoring rear-side areas of the vehicle, these rear-side areas being known as "blind spots". An option of employing lidar, "laser direction and ranging", for obstacle detection is also disclosed.

U.S. Pat. No. 7,034,668 describes methods of performing threat assessment of objects for vehicles. The methods involve determining kinematics of the vehicles and of the objects. The methods include computing brake threat numbers (BTNs) and steering threat numbers (STNs). For example, a threat assessment system operable to execute the methods comprises at least one object detection sensor for generating at least one object detection signal, and a controller coupled to the at least one object detection sensor. The controller is operable to compute a braking threat number (BTN) and a steering threat number (STN) in response to processing the at least one object detection signal. Moreover, the controller is operable to determine a threat assessment of the at least one object in response to the braking threat number (BTN) and the steering threat number (STN).

Even though systems for collision course prediction exists in prior art, there still is a need to further improve such systems. Thus, the present invention is concerned with the technical problem of providing advanced steering safety systems which are operable to provide more reliable steering intervention in potential collision situations.

SUMMARY

The disclosed embodiments provide a system for collision course prediction which does not require large computer processing capacity and which separates between objects that may or may not collide with the host vehicle with a good accuracy.

In a disclosed embodiment, a system for collision course prediction includes a sensor system installable in a host vehicle to measure the position of a target vehicle and the relative velocity of the target vehicle in relation to the host vehicle. The sensor system may furthermore measure the object acceleration, in particular the lateral acceleration of the target vehicle relative to the host vehicle.

The disclosed system also comprises a time-to-collision estimator control block that calculates an estimated time-to-collision in a straight forward deterministic way from a longitudinal distance (x), longitudinal velocity (ẋ) and longitudinal acceleration (ẍ) of the target vehicle relative to the host vehicle.

The disclosed system further includes a lateral distance estimator control block, which estimates the lateral distance between the centers of the host vehicle and target vehicle at the estimated time-to-collision. The lateral distance at the time-to-collision may be estimated from the measured lateral position, the measured lateral velocity, and the lateral acceleration at the time of estimation The lateral distance, lateral velocity and lateral acceleration may be determined at a single point in time which constitutes a time for estimation as input data from the sensor system, or alternatively the lateral distance, lateral velocity and lateral acceleration may be determined in a continuous filter process.

The system furthermore includes a collision course condition determination unit, which is arranged to determine, at an determination instant t prior to the estimated time-to-collision, whether the target vehicle will collide with the host vehicle or not dependent on if the lateral distance is within or outside a first interval. The magnitude of the first interval may be based on the lateral width of the host vehicle, the lateral width of the target vehicle and a correction term dependent on a distance to the target vehicle from the host vehicle at the determination instant.

By adding a correction term dependent on the distance to the target from the host vehicle, target angle measurement noise is taken into account. The correction term Z2 depends on the range and may depend on characteristics of a filter used to estimate y(t) and derivatives thereof. The filter used to estimate y(t) and the derivatives thereof may be arranged as a Kalman filter for y, ẏ, and ÿ.

The target angle is defined as an angle between the heading direction of the host vehicle and the location of the target vehicle. The lateral distance at the time of estimation t, may be determined a $y(t)=r \sin \alpha(t)$, where $\alpha(t)$ is the target angle at the time of estimation t, and r is the distance to the target vehicle.

In an embodiment of the invention, the collision course condition determination unit further is arranged to determine whether or not the target vehicle will collide with the host vehicle dependent on whether the estimated time-to-collision $T_{ttc}$ is within a time interval $T_{LC1}<T_{ttc}<T_{LC2}$, where $T_{LC1}$ is an estimated time for the host vehicle to enter the lane of the target vehicle and $T_{LC2}$ is an estimated time for the host vehicle to leave the lane of the target vehicle. By the condition it is ensured that the host vehicle will leave the current lane into the neighboring lane where the target vehicle is situated before the estimated time of collision. The condition further stipulates that the host vehicle should not leave the neighboring lane before the estimated time-to-collision.

The system for collision course prediction may be part of a collision avoidance and mitigation system which is arranged to assess the risk for a host vehicle to leave a current lane and enter into a neighboring lane and to generate a braking and/or a steering intervention if the risk is sufficiently high. The collision avoidance and mitigation system includes the following features:

a steering torque condition function block assessing whether a steering torque required to avoid a potential collision in the neighboring lane is within a range, a host lane threat condition functional block which is arranged at assess whether a required braking force to avoid an obstacle in the current lane is below a threshold value, a timing condition functional block which is arranged to determine whether an estimated time-to-collision is below a threshold value, and a system for collision course prediction according to what is defined above.

The steering torque condition function block determines whether the required torque $T_{req}$ to avoid a collision with the target vehicle is above a minimum level $T_{min}$ and whether the required torque $T_{req}$ is below a maximum level $T_{max}$. The minimum level is selected to ensure that an intervention is made as late as possible, while still maintaining a safety margin. The maximum level is set to assure that the steering wheel torque superposed by an intervention controller will not exceed limitations with respect to a) legal requirements and b) driver override functionality. With driver override functionality is intended the ability for a driver to regain control over the vehicle by manually overriding the superposed torque by the intervention controller. The driver must thus be able to via the steering wheel apply a torque larger than the maximum torque available from the intervention controller, or interrupt the application of the superimposed torque by applying a torque, having a magnitude exceeding a threshold value in a direction against the superimposed torque. A so applied counter torque will be interpreted as an attempt to override the automatic steering control, thus enabling the driver to perform its intended maneuver.

The host lane threat condition functional block is arranged at assess whether a required braking force $B_{req}$ to avoid an obstacle in the current lane is below a threshold value. The threshold value is selected such that sufficient braking force to stop the vehicle is available.

The timing condition functional block is arranged to determine whether an estimated time-to-collision $T_{ttc}$ is below a threshold value. The threshold is set such that traffic situations that are too distant will not trigger an intervention.

According to one embodiment, the collision avoidance and mitigation system will be arranged to generate an intervention only if all the following conditions are fulfilled:

a required braking force $B_{req}$ to avoid an obstacle in the current lane is below a threshold value;

an estimated time-to-collision $T_{ttc}$ is below a threshold value;

a required torque $T_{req}$ to avoid a collision with the target vehicle is above a minimum level $T_{min}$ and whether the required torque $T_{req}$ is below a maximum level $T_{max}$; and a collision course condition determination unit have determined, at an determination instant t prior to the estimated time-to-collision $T_{ttc}$, that the target vehicle will collide with the host vehicle.

BRIEF DESCRIPTION OF DRAWINGS

In the following embodiments of the invention will be described with references to appended drawings, where.

DETAILED DESCRIPTION OF THE EMBODIMENTS

Figure 1:
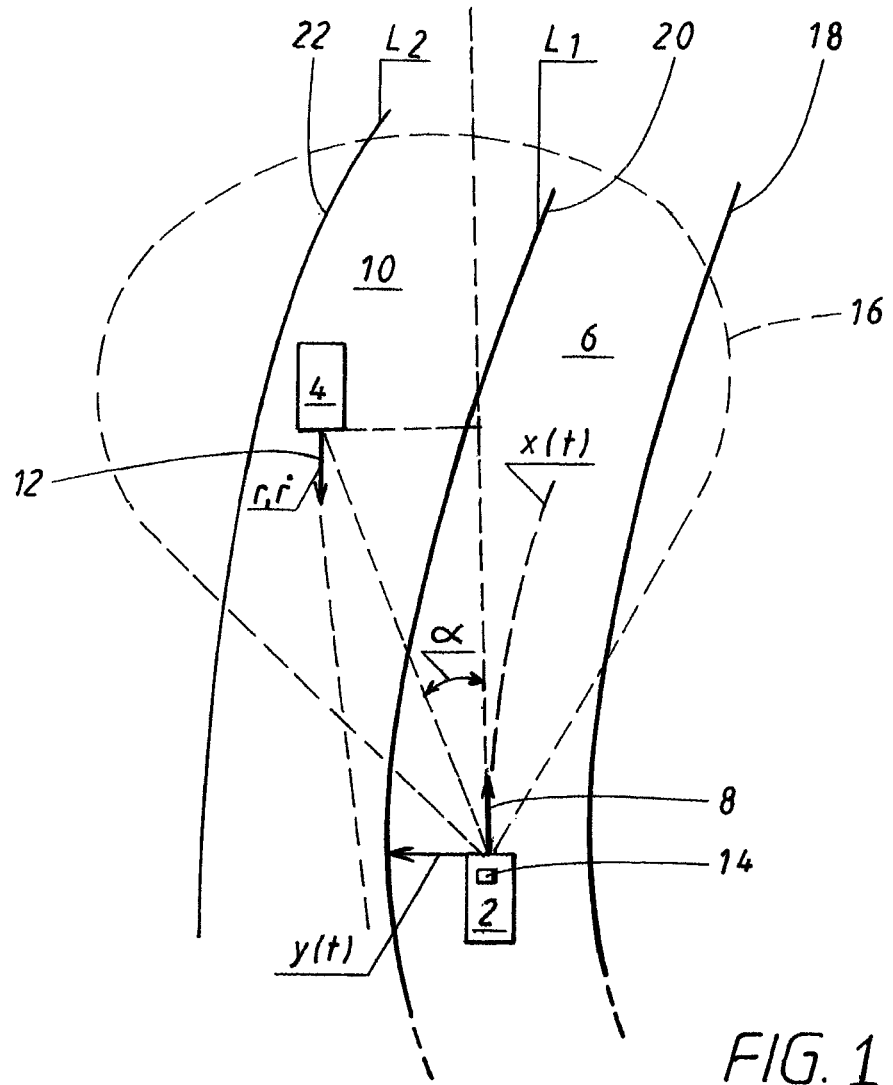
FIG. 1 shows a diagram of a traffic scenario including a host and a target vehicle.
Figure 2:
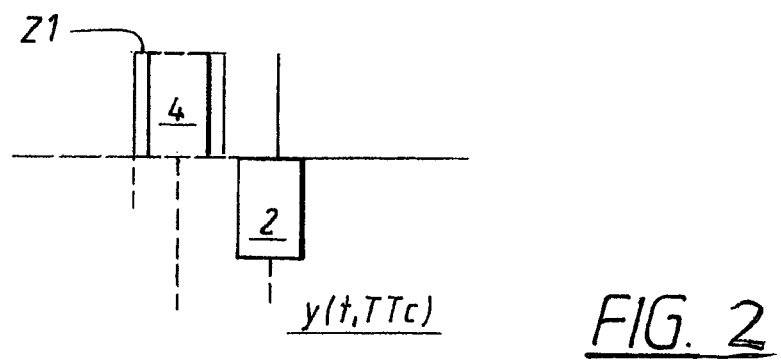
FIG. 2 shows the traffic situation at the time of collision.

In FIG. 2 depicts a traffic situation including a host vehicle 2 and a target vehicle 4. The host vehicle 2 travels in a current lane 6 in a direction indicated with an arrow 8. The target vehicle 4 travels in a neighboring lane 10 in a direction indicated by an arrow 12.

A sensor system 14 arranged on the host vehicle 2 receives input data relating to the target vehicle 4 when the target vehicle 4 is positioned within a detecting range 16 of the sensor system 14. The sensor system 14 may include radar, lidar, or optic sensors of known type and is capable of detecting at least the position $(r, \Phi)$ and a change rate $(\dot{r})$ of the radial distance to the object. From these detected variables, the position (x,y), velocity $(\dot{x},\dot{y})$ and acceleration $(\ddot{x},\ddot{y})$ of the target vehicle 4 relative to the host vehicle 2 may be estimated, suitably in a Kalman process.

Lane markers 18, 20, 22 delineate the current lane 6 of the host vehicle and the neighboring lane 10 of the target vehicle 4. Knowledge or presence of lane markers is not necessary for operation of the invention in the most general form. In an embodiment of the invention, the sensor system 14 however includes a lane marker detector such as an electro-optical sensor.

The relative distance r between the host vehicle 2 and the target vehicle 4 and the relative velocity $\dot{r}$ are detected by the sensor system 14. The lateral distance y(t) and the longitudinal distance x(t) between the host vehicle 2 and the target vehicle at a determination instant t may be expressed as:

$y(t)=r(t)\sin \alpha(t)$, and $x(t)=r(t)\cos \alpha(t)$ where $\alpha(t)$ is the target angle at the time of estimation. The target angle is defined as an angle between the heading direction of the host vehicle and the location of the target vehicle.

Figure 3:
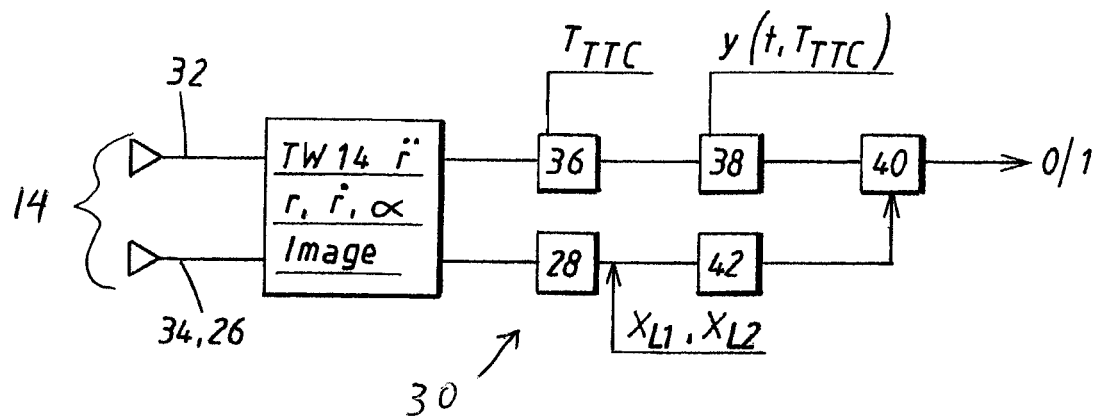
FIG. 3 shows a block diagram of a system for collision course prediction.

It should be noted that x(t) and y(t) do not refer to road coordinates, but to a coordinate system fixed to the host vehicle having the x axis in the direction of travel of the vehicle and the y axis perpendicular to the x axis. In FIG. 3, the traffic situation at the time of collision is shown. The time of collision is the point in time where the longitudinal distance x(t) between the host and target vehicle are zero. A safety zone Z1 may be added to the width of the target vehicle and/or host vehicle for caution.

Figure 4:
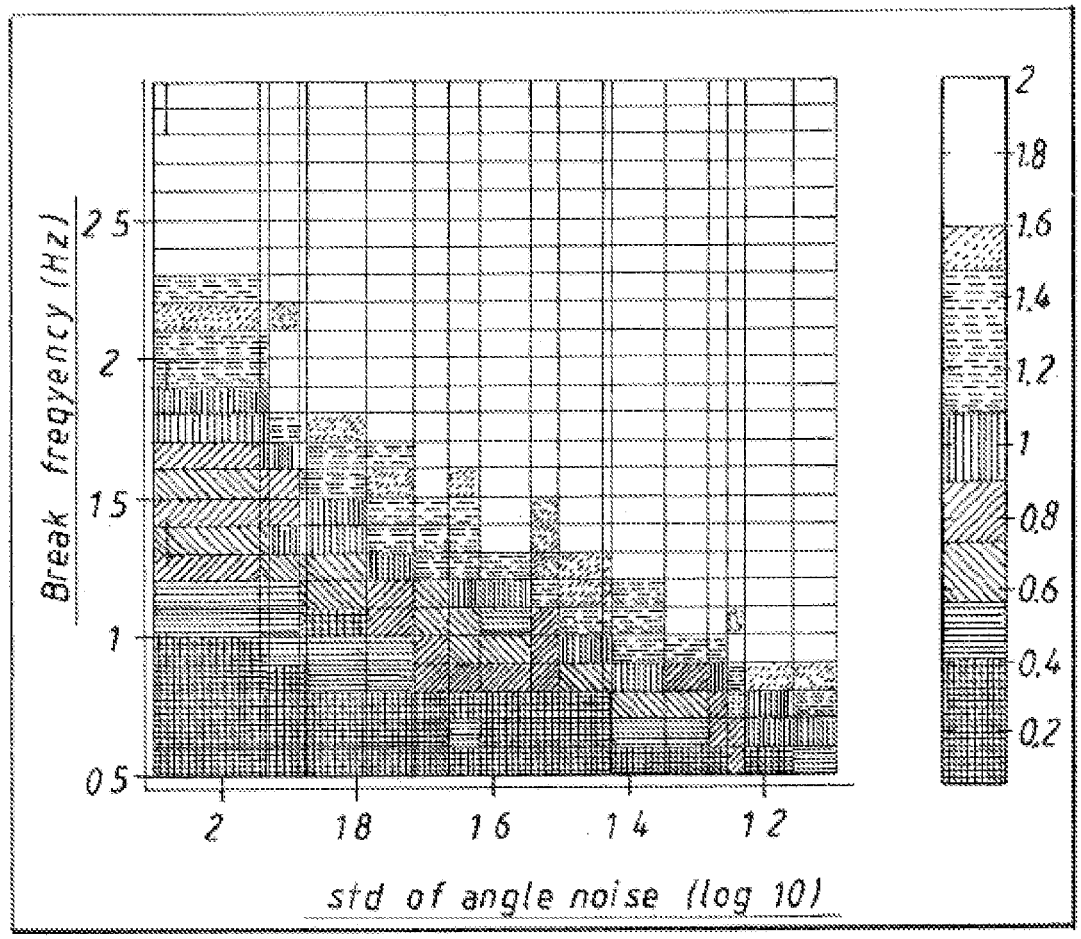
FIG. 4 shows a diagram of the uncertainty of the lateral distance as a function of filter settings and target angle noise characteristics.

FIG. 4 is a block diagram of a collision course prediction system 30. The system 30 includes sensor system 14. For determining the object position $(r,\Phi)$, and an object velocity $(\dot{r})$ of a target vehicle, conventional sensors such as a radar 32 may be used. The radar 32 detects the relative distance r between the host vehicle 2 and the target vehicle 4 and the relative velocity $\dot{r}$. An object acceleration $(\ddot{x},\ddot{y})$ may be determined in a state update equation in a Kalman processor or calculated from the object velocity. A longitudinal and lateral distance (x,y) and a lateral and longitudinal velocity may be determined from the relative distance and velocity from a target angle $\alpha$ as have been explained above. The target angle $\alpha$ may be determined from the sensor via input from the radar and/or in combination with input from an electro-optical sensor 34 in a conventional manner.

The electro-optical sensor 34 may also serve as a lane marker detector 26. Lane marker detector may be connected to a road coordinate module 28, which may utilize a Kalman filter process which continuously updates an estimation of road coordinates and which determines the position of the host vehicle and external objects such as the target vehicle in a road coordinate system. The road coordinate module 28 generates a continuous line from detected lane marker such that a coordinate system (x',y') for the shape of the road is generated and the position of the host and detected target vehicles can be located in the coordinate system of the road. A suitable system for performing lane detection and calculation of road coordinates is sold under the trade name of MobilEye. A more extensive explanation of the underlying theory may be found in "An automotive Lane Guidance System." A. Eidehall Thesis no 1122, Linköping Studies in Science and Technology, Linköping 2004.

The system 30 furthermore includes a time-to-collision estimator control block 36, which calculates an estimated time-to-collision $T_{ttc}$ based on a longitudinal distance (x), longitudinal velocity $(\dot{x})$ and longitudinal acceleration $(\ddot{x})$ of the target vehicle relative to the host vehicle. In a most straight forward embodiment, the time-to-collision $T_{ttc}$ is calculated from the equation $$x(t) + \dot{x}(t)' \; T_{ttc} + \frac{\ddot{x}(t) \cdot T_{ttc}^2}{2} = 0$$

where x(t) is the longitudinal distance to the target vehicle at the time of estimating the time-to-collision $T_{ttc}$, $\dot{x}(t)$ is the relative longitudinal velocity of the target vehicle relative to the host vehicle at the time of estimating the time-to-collision $T_{ttc}$, and $\ddot{x}(t)$ is the relative longitudinal acceleration of the target vehicle relative to the host vehicle at the time of estimating the time-to-collision $T_{ttc}$.

An instantaneous time-to-collision can be calculated by solving the above equation for the time-to-collision $T_{ttc}$ where the longitudinal distance and longitudinal relative velocity are measured at the time of estimation t, and the relative longitudinal acceleration may determined in a state update equation in a Kalman process.

The system 30 further includes a lateral distance estimator control block 38, which estimates the lateral distance (y) between the centers of the host vehicle and target vehicle at the estimated time-to-collision $T_{ttc}$. The lateral distance y(t) at the time-to-collision is estimated from the measured lateral distance at the time of estimation (t), the measured lateral velocity $\dot{y}(t)$ at the time of estimation (t) and the lateral acceleration $\ddot{y}$ at the time of estimation according to the following equation:

$$y(t, T_{ttc}) = \dot{y}(t)' \ T_{ttc} + \frac{\ddot{y}(t) \cdot T_{ttc}^2}{2} + y(t)$$

The lateral distance, lateral velocity and lateral acceleration may be determined at a single point in time which constitutes a time for estimation as input data from the sensor system, or alternatively the lateral distance, lateral velocity and lateral acceleration may be determined in a continuous filter process.

System 30 also includes a collision course condition determination unit 40, which is arranged to determine, at a determination instant t prior to the estimated time-to-collision $T_{ttc}$, whether or not (or a probability that) the target vehicle will collide with the host vehicle dependent on if the lateral distance is within or outside a first interval. The magnitude of the first interval is based on the lateral width of the host vehicle, the lateral width of the target vehicle, and a correction term Z2 dependent on a distance to the target vehicle from the host vehicle at the determination instant t.

The collision course determination unit 40 determines that the host vehicle will collide with the target vehicle if the following condition is fulfilled:

Not [$y(T_{ttc})$>(HW/2+TW/2+Z1+Z2) or $y(T_{ttc})$<−(HW/2+TW/2+Z1+Z2)], where HW is the width of the host vehicle, TW is the width of the target vehicle, and Z1 is a safety margin.

Safety margin Z1 may be set to zero, or may be of a predetermined positive magnitude, or may be dependent on the width of the target vehicle. The width of the host vehicle is known. The width of the target vehicle is determined by the target vehicle, from the input of the radar and/or electro-optical sensor in a conventional manner.

By adding correction term Z2 dependent on the distance to the target from the host vehicle at the determination instant t, target angle measurement noise is taken into account. The correction term Z2 depends on the range and may depend on characteristics of a filter used to estimate y(t) and derivatives thereof. The filter used to estimate y(t) and the derivatives thereof is preferably arranged as a Kalman filter for y, ẏ, and ÿ.

The correction term Z2 may be expressed as:

Z2=Z0+k*r, where Z0 is a constant, r is the distance to the target vehicle, and k* is a coefficient dependent upon sensor noise distribution.

Determination of coefficient k* may be made with reference to FIG. 4, in which the break frequency of the sensor used to determine the target angle is positioned on the ordinate (y-axis), and the logarithm value of standard deviation of the angle noise is positioned on the abscissa (x-axis). The values in the field indicated the magnitude of Z2 for a specific distance. Hence for a sensor having a given value of standard deviation of the angle noise an appropriate magnitude of the term Z2 may be set. The diagram is generated by simulation of a filter used to estimate $y(t; t_{TTC})$.

Input data $$\begin{pmatrix} R \\ \alpha \end{pmatrix},$$

where R is the distance to the target vehicle, and α is the angle to the target vehicle is transformed into a lateral distance y by the transform y=R cos α.

state feedback observer in the following form is used:

$\hat{y}(t+1)=A\hat{y}(t)+K(t)[y(t)-C\hat{y}(t)]$, where ŷ is a state vector $$\begin{pmatrix} y \\ \dot{y} \\ \ddot{y} \end{pmatrix}$$

including the lateral position, lateral velocity and lateral acceleration.

K(t) is computed as:

$P(t)=AP(t-1)A'+Q$ $S(t)=CP(t)C'+R$ $K(t)=P(t)C'inv((S(t))$, and $P(t+1)=P(t)-K(t)SK(t)'$ The model is defined by:

$$A = \begin{pmatrix} 1 & T & T^2/2 \\ 0 & 1 & T \\ 0 & 0 & 1 \end{pmatrix}, \quad C = (1 \ 0 \ 0)$$

Here T is the sample interval.

The parameters Q and R are considered to be design parameters, an example of choice can be:

$$Q = \begin{pmatrix} 0,3 & 0 & 0 \\ 0 & 1 & 0 \\ 0 & 0 & 0,1 \end{pmatrix} \text{ and } R = 1.$$

Furthermore Q and R can be scaled to obtain the requested bandwidth, i.e. the noise suppression versus speed trade off. X(t) is initialized according to the first measurement. The initialization of X(t) is also a design parameter. An example of a starting value can be:

$$P_o = \begin{pmatrix} 1 & 0 & 0 \\ 0 & 100 & 0 \\ 0 & 0 & 10 \end{pmatrix}$$

Hence by selection of different Q and R for sensors having different standard of deviation for angle noise, the diagram of FIG. 4 can be obtained.

An estimate $y(t,T_{ttc})$ is calculated by use of the estimated state vector ŷ above mentioned state feedback observer as $y(t,T_{ttc})=y(t)+\dot{y}(t)*T_{ttc}+\ddot{y}(t)*T_{ttc}^2$. A value of $y(t,T_{ttc})$ is calculated analytically from a starting distance, simulating an ideal sensor with no noise. The difference between those two measures constitutes a value of Z2 for a specific standard of angle noise and a specific break frequency for the observer given by Q and R. In order to form the diagram in FIG. 4, this calculation is performed a large number of times for each selection of Q and R and the given standard deviation of angle noise for the sensor, and a mean value is formed and entered into the diagram FIG. 4 shows the magnitude of the term Z2 at a specified distance (100 m) as a function of the break frequency of the Kalman frequency and a given standard deviation of angle noise of the sensor detecting the object. The standard deviation of sensor detecting the object is a hardware parameter, while the break frequency is dependent on the design of the filter in a conventional manner.

Hence, the simulation enables a person skilled in the art to select an appropriate sensor having a sufficiently low standard deviation of angle noise for a specific filter in order to obtain a desired value of the term Z2, or enables to set a correct value to the term Z2 for a given filter and sensor.

Returning now to FIG. 3, the collision course determination unit 40 may generate an output representing either that the host vehicle 2 will collide with target vehicle 4 or representing that the host vehicle 2 will not collide with target vehicle. The output can be represented by a high or a low signal, a digital 0 or 1 signal or any other form representing the two different scenarios. Here 1 will mean that host and target vehicle have a course that may lead to a collision. Alternatively, collision course determination unit 40 may generate an output representing a probability that host vehicle 2 may collide with target vehicle 4.

Optionally, the system 30 includes a host vehicle in neighboring lane control block 42. The host vehicle in neighboring lane control block 42 determines if the host vehicle 2 will enter the neighboring lane 10 in which the target vehicle is present. This may be done by observing, using a sensor such as electro-optical sensor 34, the location of the lane markers 20, 22 defining the lanes $L_1$ and $L_2$. The distance to the lane markers $x_{L1}$ and $x_{L2}$ is determined in road coordinate module 28. The time to lane crossing $T_{LC1}$, $T_{LC2}$, of the first and second lanes defining the neighboring lane may be determined directly from knowledge of the current speed of the host vehicle. Alternatively the time to lane crossing can be determined by use of a Kalman filter.

In that case, the collision course determination unit 40 determines that the host vehicle will collide with the target vehicle if the following condition is fulfilled:

Not [$y(T_{ttc})$>($HW/2+TW/2+Z1+Z2$)

or $y(T_{ttc})$<−($HW/2+TW/2+Z1+Z2$)]

and the estimated time-to-collision $T_{ttc}$ is within a time interval $T_{LC1}$<$T_{ttc}$<$T_{LC2}$.

Figure 5:
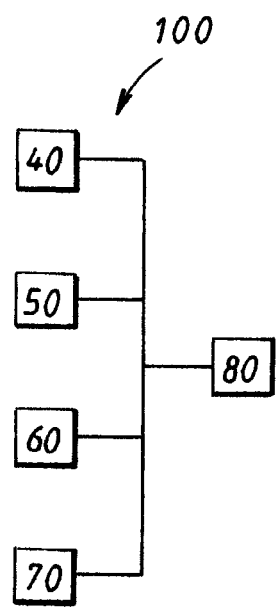
FIG. 5 shows a block diagram of a collision avoidance and mitigation system.

In FIG. 5 a block diagram of a collision avoidance and mitigation system 100 is shown. System 100 uses active steering and/or braking interventions to prevent or reduce the severity of a collision between a host vehicle and a target vehicle or other target object. The collision avoidance and mitigation system 100 includes a steering torque condition function block 50 for assessing whether a steering torque required to avoid a potential collision in the neighboring lane is within a range. The steering torque condition function block determines whether the required torque $T_{req}$ to avoid a collision with the target vehicle is above a minimum level $T_{min}$ and whether the required torque $T_{req}$ is below a maximum level $T_{max}$. The minimum level may be selected to ensure that an intervention is made as late as possible, while still maintaining a safety margin. The maximum level may be selected to assure that the steering wheel torque superposed by an intervention controller will not exceed limitations with respect to legal requirements and/or driver override functionality. Driver override functionality provides the ability for a driver to manually override the superposed torque applied by the intervention controller. The driver must thus be able, using the steering wheel, to apply a torque larger than the maximum torque available from the intervention controller.

The collision avoidance and mitigation system 100 further includes a host lane threat condition functional block 60 which is arranged at assess whether a required braking force $B_{req}$ to avoid an obstacle in the current lane is below a threshold braking force value. The threshold braking force value is selected such that sufficient braking force to stop the vehicle is available. A suitable braking force threshold value may be set between 0.2 and 0.7 g, and more precisely between 0.2 and 0.5 g.

The collision avoidance and mitigation system 100 further includes a timing condition functional block 70 which is arranged to determine whether an estimated time-to-collision $T_{ttc}$ is below a threshold time value. The threshold time value is selected such that traffic situations that are too distant will not trigger an intervention. The threshold time value may be selected between 1-3 seconds, and more precisely between 1.9-2.5 seconds.

The collision avoidance and mitigation system 100 may also include a collision course determination unit 40 as described in detail above in reference to FIG. 3.

The disclosed collision avoidance and mitigation system employs forward collision warning (FCW) and forward collision mitigation (FCM) and may implement active steering intervention(s) and/or active braking interventions. Moreover, the present collision avoidance and mitigation system is operable to employ a decision algorithm implemented either in dedicated hardware, as software executable on computing hardware, or a mixture of such hardware and software.

Figure 6:
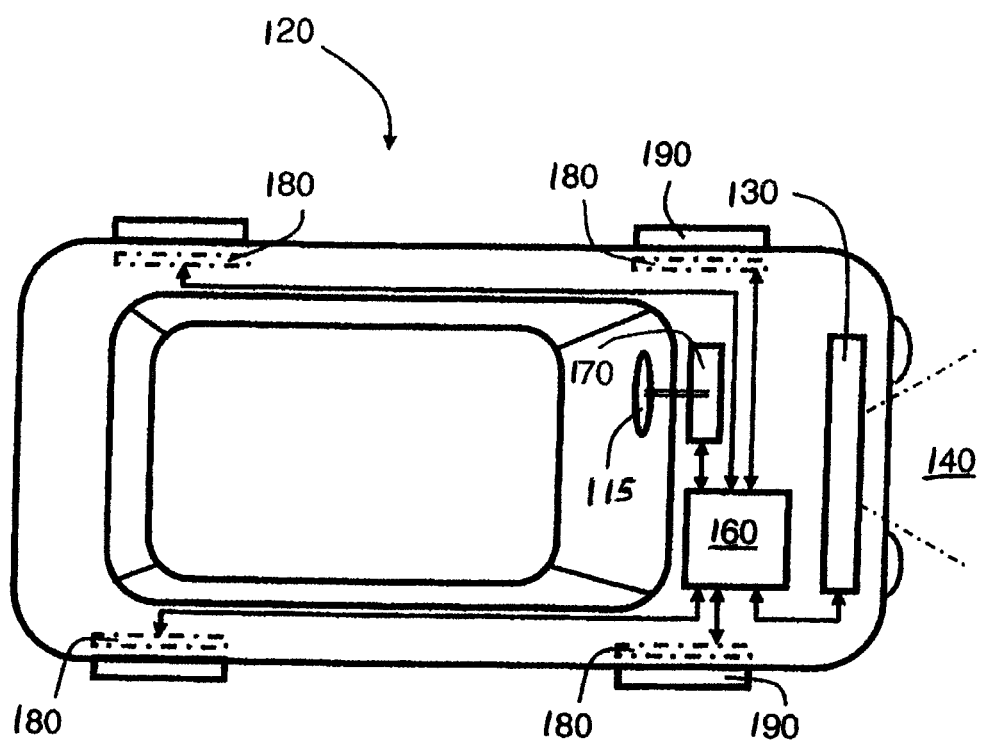
FIG. 6 is a schematic illustration of the automobile according to a described embodiment.

Referring to FIG. 6, there is shown a schematic diagram of automobile indicated generally by 120. At a front region of the automobile 120, there is included a sensor arrangement 130 comprising one or more sensors for sensing in a sensing region indicated generally by 140 in front of the automobile 120. Additional parts included in the automobile 120 comprise a data processing unit 160, a steering arrangement 170 and one or more brake units 180 associated with wheels of the automobile 120, the one or more brake units 180 being operable to reduce velocity of the automobile 120 when applied; the data processing unit 160 is also conveniently referred to as being a "data processing arrangement". Processor 160 is operable to receive the sensor signals and to compute positions and relative velocities of one or more potentially hazardous objects 230 in the sensing region 140. Processor 160 is further operative to compute a value representative of a steering torque required to be applied to steer automobile 120 so as to avoid the hazardous objects 230, to retrieve a value representative of maximum torque available to steer the automobile 120, and to compare the value representative of the maximum torque available with the value representative of the steering torque required to avoid the hazardous object, and to decide how to intervene in response to the comparison.

In a potential crash scenario, the steering force applied to the front wheels 190 is potentially capable of providing autonomous crash avoidance by steering as will be elucidated in more detail later. Additionally, the data processing unit 160 is coupled to the one or more brake units 180 for autonomously applying braking fortes to the automobile 120 in a potential crash scenario as will be elucidated later.

Figure 7:
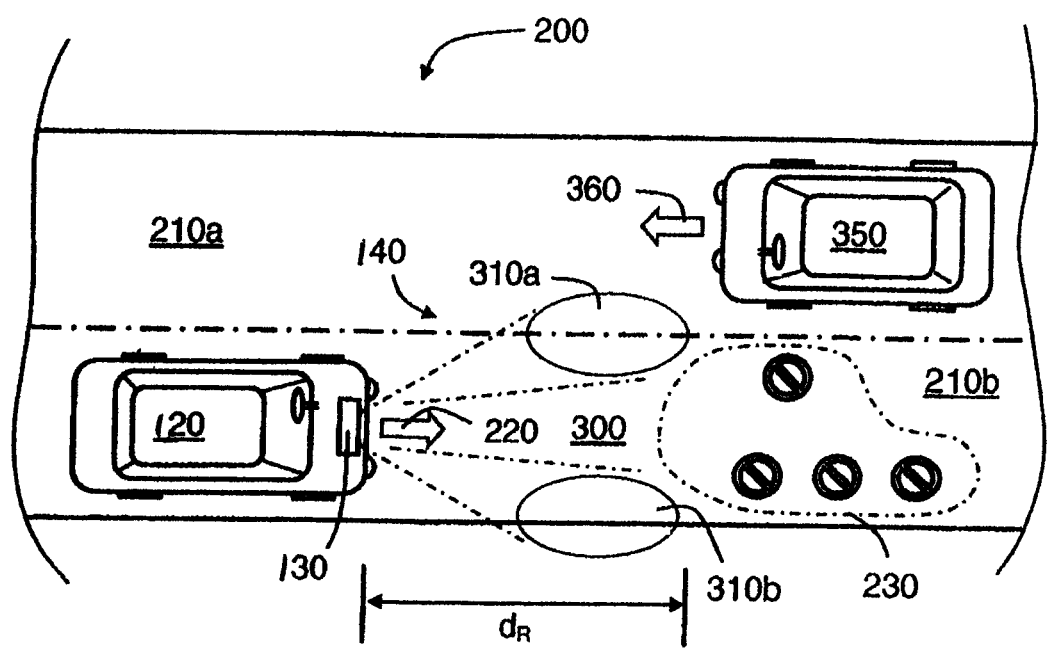
FIG. 7 is a plan-view of a section of road, turnpike or highway including an automobile configured to function pursuant to a described embodiment.

In FIG. 7, there is shown a section of road, indicated generally by 200. The section 200 comprises first and second lanes 210a, 210b. The automobile 120 is operable to travel in a forward direction denoted by an arrow 220 along the second lane 210b.

The sensor arrangement 130 may include a first sensor assembly operable to emit radiation towards the sensing region 140, to sense such radiation reflected from the one or more objects 230, and to generate a corresponding first set of sensor signals that express the position of objects 230 relative to the automobile 120.

Beneficially, the first sensor assembly includes an angularly scanned sensor or a sensor which is capable of providing angular discrimination between the potentially hazardous objects 230 as well as sensing their closing velocities $V_{Cl}$, for example by way of Doppler frequency shift. More beneficially, the first sensor assembly is implemented to include at least one of: an angularity-discriminating infra-red (IR) light direction and ranging (lidar), and/or an angularity-discriminating microwave radio direction and ranging (radar). The sensor arrangement 130 further comprises a second sensor assembly beneficially comprising one or more video electro-optical sensors for providing a second set of sensor signals conveying an optical image of the sensing region 140. Optionally, the sensor arrangement 130 is further complemented with other types of sensors, for example ultrasonic sensors operable in a radar-manner to scan the region 140.

Optionally, the one or more electro-optical sensors are operable to sense in one or more of the visible optical spectrum and the infra-red (IR) optical spectrum. The IR spectrum is of especial benefit for night driving and misty or foggy conditions. As will be more fully explained, the data processing unit 160 is operable to process the first and second sets of signals to identify there from signals corresponding to specific objects 230, wherein the first set of signals are most useful in determining the closing velocity $V_{Cl}$ and distance or position $d_{Ri}$. The second set of signals, derived from the optical sensor, may be most useful in providing confirmation regarding the one or more objects 230 identified from processing the first set of signals, and in deriving a measure of spatial extents of the one or more objects 230 identified from processing the first set of signals.

For example, with regard to spatial extent, a sheet of aluminum foil (not shown) blowing about on the section of road 200 is susceptible to potentially providing stronger microwave reflected signals than a concrete block (not shown) fallen from a truck onto the section of road 200, yet the concrete block represents a potentially more dangerous impact hazard to the automobile 20 than the aluminum foil. In executing risk assessment, the data processing unit 160 requires further information regarding the nature of the one or more objects 230, namely a collision hazard represented by the one or more objects 230. Use of the first and second sets of signals provides this further information such that each of the one or more objects 230 has associated therewith in the data processing unit 160 a corresponding hazard assessment number Ki indicative of a risk presented by the object, there being n objects in the sensing region 40, each object being individually denoted using an integer index i such that i≤n.

The data processing unit 160 is beneficially implemented in application-specific digital hardware and/or using computing hardware operable to execute software. Moreover, the data processing unit 160 is coupled to the sensor arrangement 130 for receiving the first and second sets of sensor signals there from. Furthermore, the data processing unit 160 is coupled to one or more actuators included in the steering arrangement 170. Actuators may, for example, be one or more electric motors operable to generate a steering torque to orientate front wheels 190 of the automobile 120. The steering torque supplied by the actuators is also felt in operation by a driver at a steering wheel 115 of the automobile 120 and beneficially provides a tactile indication of a potential risk represented by the one or more objects 230. In a potential crash scenario, the steering torque applied to the front wheels 190 is potentially capable of providing autonomous crash avoidance as will be elucidated in more detail later. Additionally, the data processing unit 160 is coupled to the one or more brake units 180 for autonomously applying braking forces to the automobile 120 in a potential crash scenario as will also be further elucidated later.

In operation, the data processing unit 160 computes from the first set of sensor signals angular positions or distances $d_{Ri}$ and closing velocities $v_{Cl}$ of the one or more potentially hazardous objects 230 in respect of the sensor arrangement 130. The processing arrangement 160 analyses the positions or distances $d_{Ri}$ and the closing velocities $V_{Cl}$ to identify the one or more objects 230 which represent collision risks; estimate a value of a required steering s necessary to avoid the one or more objects 230; compute a maximum available torque $T_{MAX}$ which can be applied to steer away from the one or more objects 230 to avoid collision therewith; compute a ratio of the maximum available torque $T_{MAX}$ and the required steering torque Ts; and determine how to intervene by applying a steering torque to the steering arrangement 170 in response to a value of the computed ratio.

The data processing unit 160 may be prevented from intervening when the maximum available torque $T_{MAX}$ is less than the required steering torque Ts necessary to avoid the one or more objects 230. Moreover, the data processing unit 160 may be hindered from intervening when the required steering torque Ts is greater than an upper torque threshold or below a lower torque threshold.

Comparing a value representing the required steering torque Ts with a value representing a maximum torque available $T_{MAX}$ provides an effective measure for deciding whether or not intervention should be allowed and, in the event intervention is allowed, timing of the intervention. The comparison may be made by forming a ratio referred to herein as the STN (steering threat number). STN is a ratio of a calculated value indicating the required steering torque over a retrieved value indicating the maximum torque available, that is STN=Ts/$T_{MAX}$. Other suitable representations allowing a comparison of these torques are possible, such as the square of the torques (Ts/$T_{MAX}$)$^2$, the square root of the torques (Ts/$T_{MAX}$)$^{1/2}$ or any other functions f,g of the torques (f(Ts)/g($T_{MAX}$)) which allows for estimation of the relative magnitude of the maximum torque available with the steering torque required.

A requirement of the functions f and g are that they do not contain any singular points and that they are smooth functions in a relevant interval for the torques. Furthermore they must both be continuously increasing or both continuously decreasing in the relevant interval of the torques.

The required steering torque may be calculated using a simulation model of the vehicle. A thorough description of how to implement a model is found in Wong, J. Y., Theory of ground vehicles (1993), John Wiley & Sons, Inc. Instead of simulation, maps or tables providing information of necessary torque to avoid a certain object, which future trajectory may be determined, when traveling at a known speed relative to the object, may be used.

The maximum available torque may be retrieved from a memory cell, a map stored in the processing arrangement or calculated. The maximum available steering torque may be a limit set by legal requirement that additional steering torque applied by safety systems should not exceed a certain limit. The maximum available steering torque may alternatively be a limit corresponding to the maximum torque output from a servo motor. Alternatively, the maximum available steering torque may be selected such that a standard driver should always be capable of overriding the steering torque applied. Sensor arrangements may be provided such that an adaptable upper limit is set, which adaptable upper limit is dependent on the action taken by the driver under the event. The sensor arrangement may typically be aware of whether the driver is steering in the opposite direction of the applied torque or not.

The steering intervention determined by processing arrangement 160 may be any or a combination of the events defined below:

- the collision avoidance and mitigation system may be arranged to not apply any additional steering torque in the event the steering torque required exceeds the maximum torque available to avoid the hazardous object;
- the collision avoidance and mitigation system may be arranged to compute a ratio value representative of a ratio of the required steering torque to the maximum torque available.
- the collision avoidance and mitigation system may be arranged to not apply any steering torque in the event the ratio value is below a first threshold value;
- the collision avoidance and mitigation system may be arranged to intervene in the event the ratio value is above a first threshold value, and/or
- the collision avoidance and mitigation system may be arranged to intervene by applying a steering torque in order to avoid the hazardous objects.

In an embodiment of the collision avoidance and mitigation system, an intervention steering torque is applied when a steering threat number (STN) exceeds a first threshold level T1. STN is defined as the ratio of a calculated value indicating the required steering torque over a retrieved value indicating the maximum torque available. Thus, a steering intervention is indicated when:

$$STN = Ts/T_{MAX} > T_1.$$

No intervention is made if the ratio is below this first threshold value T1 or if the required steering torque exceeds the maximum torque available. The first threshold value may be suitably selected between 0.6 and 0.95, and more precisely between 0.75 and 0.90.

Computation of the required steering torque Ts is complex and will be elucidated further later; computation of the required torque Ts is, for example, based upon spatial position of the one or more objects 230 detected and their distance $d_g$ from the automobile 20 and/or their closing velocity $V_{Cl}$. As elucidated earlier, it is beneficial that the force that may be applied by the driver $T_{DRIVER} > Ts$.

An algorithm is operable to compute a steering threat number (STN) defined by:

$$STN = Ts/T_{MAX}$$

When the steering threat number STN is less than unity, namely STN<1, the data processing unit 160 is susceptible to being able to steer the automobile 120 away from a potential collision by applying a steering torque to the steering arrangement 170. Thus, the data processing unit 160 is beneficially operable to apply automatic collision avoidance steering to the steering arrangement 170 when the threat number STN is less than unity.

The present collision avoidance and mitigation system is also concerned with a strategy for coping with the steering threat number STN being greater than unity, i.e. the required torque Ts to avoid a collision by steering is greater than the maximum torque $T_{MAX}$ that the data processing unit 160 is permitted to invoke from the steering arrangement 170. The data processing unit 160 is operable in such a situation wherein STN>1 to refrain from applying any collision avoidance steering force to the steering arrangement 170; if steering is incapable of avoiding a collision, it is generally assumed that the driver of the automobile 120 should have full control of the automobile steering.

The data processing unit 160 is operable to compute updated values for the steering threat number STN whilst application of required steering torque Ts is invoked from the steering arrangement 70, namely during a relatively short time period during which the data processing unit 160 attempts to avoid a crash by steering intervention when the threat number STN is less than unity. The data processing unit 160 is thus capable of dynamically monitoring success of its steering intervention while the intervention is occurring. Thus, if the steering threat number STN decreases during a steering intervention, the data processing unit 160 is operable to interpret such a decrease as being indicative that the automobile 120 is being successfully autonomously steered out of a potential collision situation. Conversely, if the steering threat number STN increasing during a steering intervention, the processing unit 160 is susceptible to interpreting such an increase that the intervention is potentially unsuccessful, for example as a consequence of incorrect assessment of the one or more objects 230 in the region 140, or that the driver of the automobile 120 is applying an opposing force to momentarily override operation of the data processing unit 160. When the threat number STN in such case exceeds unity, the data processing unit 160 is operable to terminate the steering intervention.

Optionally, the data processing unit 160 is configured to be operable so that any increase in the threat number STN during a steering intervention will result in termination of the steering intervention.

Collision avoidance and mitigation system 100 may furthermore include a processing arrangement operable to receive the sensor signals and to compute positions and relative velocities of the one or more potentially hazardous objects in the sensing region there from, and to compute there from a relatively safest direction ($F_{lane}$) along which the automobile is capable of traveling to avoid the one or more potentially hazardous objects. The processing arrangement may be further operable to compute a steering torque required to be applied to steer the automobile in the safest direction ($F_{lane}$), to compute a maximum torque available to steer the automobile in the safest direction ($F_{lane}$), to compute a ratio value representative of a ratio of the required steering torque to the maximum torque available, and to compute whether or not to intervene to apply the steering torque to steer the automobile in the safest direction ($F_{lane}$) in response to the ratio value.

As an example, the safest direction may be selection between avoiding a potentially hazardous object by turning left or turning right in order to pass the object on different sides of the vehicle. The selection may be based on assigning threat levels on the respective side of the potentially hazardous object. The threat levels may be assessed by consideration of future trajectories of the hazardous objects.

In one embodiment of the collision avoidance and mitigation system, the safest direction ($F_{lane}$) of the automobile 120 is defined as a portion of the sensing region 40 towards which it is safe for the automobile 120 to travel with a minimal risk of colliding with any objects taking into account trajectories of such objects; moreover, the safest direction ($F_{lane}$) is not to be confused with the aforementioned second lane 210b of the section of road 200. Furthermore, the data processing unit 160 is operable to continuously update in a temporally iterative manner its data regarding angular direction of the safest direction ($F_{lane}$).

In a normal driving situation devoid of potential hazards in the direction of travel 220 of the automobile 20, the data processing unit 160 will compute a central portion of the sensing region 140 to be devoid of one or more obstacles such that the automobile 120 can safely travel in a direction of the central portion. In such a situation, the central portion is regarded by the data processing unit 160 to be the safest direction ($F_{lane}$). In the normal driving situation, various objects will be occasionally identified by the processing unit 160 to lie at the right-hand and left-hand side periphery regions 310b, 310a of the sensing region 140 with relative velocities $V_{Ci}$ and positions of distances $d_{Ri}$, which are not likely to intercept the safest direction ($F_{lane}$) and which are not otherwise on course to collide with the automobile 120. In such a scenario, the data processing unit 160 is operable to selectively apply a torque, as will be elucidated in more detail later, via the one or more aforementioned actuators associated with the steering arrangement 170 to steer the automobile 120 in a direction of the safest direction ($F_{lane}$), thereby steering away from any potential hazards. In normal operation, a driver of the automobile steering the automobile 120 in a direction of the safest direction ($F_{lane}$) devoid of hazardous objects enables the data processing unit 160 to obtain a cue for defining the safest direction ($F_{lane}$) to be subsequently followed. When the driver steers the automobile 120 to an exit of the section of road 200, the safest direction ($F_{lane}$) will then no longer correspond to the second lane 210b as the automobile 120 exits.

Potentially dangerous conditions are susceptible to arising in an event of the driver of the automobile 120 momentarily losing concentration, becoming drowsy, being temporarily interrupted, and/or not being able to cognitively appreciate the presence of one or more potentially hazardous objects present or likely soon to be present in the safest direction ($F_{lane}$). In such case, the driver is incorrectly defining the direction of travel 220 of the automobile 120. A lack of concentration can arise from driver fatigue wherein the driver falls asleep at a wheel 115 of the automobile 20. Temporary interruption of the driver can occur when the driver is exposed to bright sunlight at low angle shining through a front window of the automobile 120 into eyes of the driver, thereby temporarily blinding a field of view of the driver. Such problems are especially exacerbated when a front windscreen of the automobile 120 is dirty, misted or otherwise obstructed. Lack of cognitive appreciation can arise as a consequence of fatigue or distraction within the automobile 120, for example noisy and mischievous children being transported on a rear seat of the automobile. The data processing unit 160 is, as elucidated earlier, operable to compute closing velocities V and positions or distances $d_{Ri}$, of the one or more objects 230 to determine whether or not (or a probability that) they are likely to occlude the safest direction ($F_{lane}$).

If the driver of the automobile 120 falls asleep such that the automobile 120 steers towards a vehicle 350 traveling in an opposite direction 360 in the first lane 210a as shown in FIG. 7, the data processing unit 160 will identify that the vehicle 350 is in a trajectory from the left-hand side peripheral side region 210a to the safest direction ($F_{lane}$) 300, such that the safest direction ($F_{lane}$) has effectively started shifting towards the right-hand Side peripheral side region 210b. In such a scenario, the data processing unit 160 is operable to apply a corrective steering torque to the steering assembly 170 to steer away from the vehicle 350 towards the second lane 210b. As will be elucidated later, the corrective steering torque may be of a magnitude corresponding to a collision risk Ki represented by the vehicle 350. The steering torque has, for example, a magnitude which is a linear, square-law or other polynomial function of the collision risk Ki represented by the vehicle 350.

As the automobile 120 approaches the vehicle 350, the corrective steering torque attempting to steer the automobile 120 back towards the second Lane 210b becomes progressively greater because of potentially increasing danger represented by the vehicle 350. Moreover, the corrective steering torque applied by the data processing unit 160 via the steering assembly 170 is beneficially of a maximum magnitude by design of the aforementioned actuators, or intentionally limited to the maximum magnitude by the data processing unit 160, such that the driver is capable of overriding the corrective steering torque in a potential situation that the data processing unit 160 has incorrectly assessed significances of the one or more potentially hazardous objects 230.

The automobile 120 may optionally also be provided with an automatic braking system for crash mitigation or crash avoidance.

Figure 8:
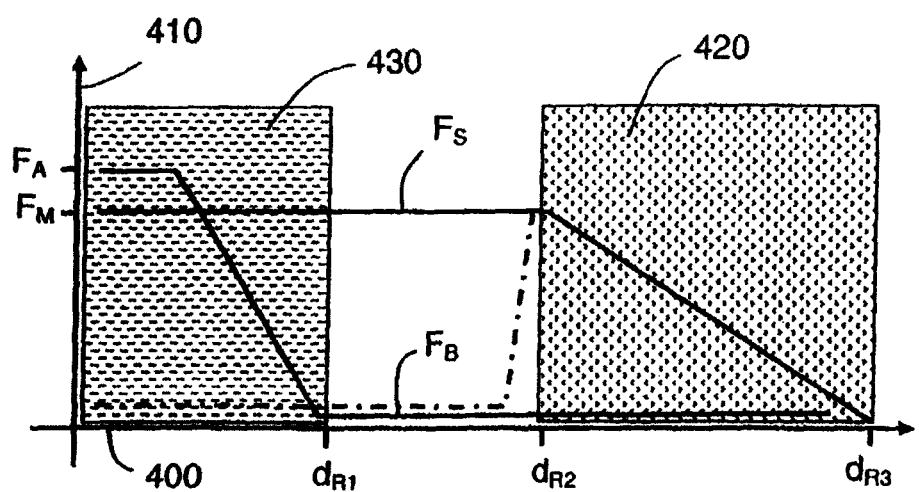
FIG. 8 is a graph illustrating velocity range in which an automating braking system and an automatic steering system are configured to function.

The graph of FIG. 8 depicts a possible mode of operational mode of such an automatic braking system in concert with an active steering system. In the graph, an abscissa axis 400 represents distance of the automobile 120 from a potentially hazardous object present in the safest direction ($F_{lane}$) and an ordinate axis 410 represents the level of braking force or corrective steering force susceptible to being invoked by the data processing unit 160 in operation.

When the potentially hazardous object 230 is at a range of greater than $d_{R3}$ from the automobile 120, it is too remote to be reliably sensed by the sensor arrangement 130 and therefore the data processing unit 160 disregards the potentially hazardous object 230. As an example, contemporary sensing technology enables the distance $d_{R3}$ to be in a range of 100 to 150 meters. Moreover, when the potentially hazardous object 230 is at a range between $d_{R2}$ and $d_{R3}$ from the automobile 120 as denoted by a regime 420, the data processing unit 160 is operable to apply a collision avoidance steering torque felt at the wheel 115 by the driver wherein the torque is represented by a curve $F_S$ which progressively increases as the one or more potentially hazardous objects 230 approach the automobile 120.

Below the distance $d_{R2}$, the data processing unit 160 is operable to compute that collision avoidance by steering is not likely to assist the driver, in which case the collision avoidance steering torque applied by the actuators may be maintained at a maximum allowed torque $T_M$ to keep the driver aware of the potentially imminent collision, or the applied torque may be reduced to substantially zero, as illustrated as a dotted line in FIG. 8, so as the provide the driver with full steering control.

Below a distance $d_{R1}$, in a regime 430, the data processing unit 160 is operable to apply autonomous braking as a last resort to provide collision avoidance or collision mitigation. A braking force $F_B$ which is autonomously applied increases as the distance $d_{R1}$ decreases, the braking force being limited to a maximum force $F_A$ that can safely be applied by the automobile 120.

Thus, as illustrated in FIG. 8, if the collision avoidance steering torque generated by the actuators in response to instructions from the data processing unit 160 is unable to divert the automobile 120 from colliding with the vehicle 350, automatic braking is applied by the automobile 120 as last resort. However, both the collision avoidance steering and the automatic braking for the automobile 120 can be synergistically provided.

When automatic crash mitigation or avoidance is implemented in the automobile 120, a required braking force $F_R$ required to avoid a collision with a target vehicle ahead of automobile 120 is computed in the data processing unit 160. Computation of the required braking force $F_R$ may optionally take into account road conditions as sensed by additional sensors (not shown) included within or on the automobile 120, for example precipitation and temperature sensors. The data processing unit 160 executes a braking algorithm and then compares the computed required braking force $F_R$ to avoid a collision with the available braking force, $F_A$, which is based on physical limitations of the automobile 120, such limitations including tire-to-road friction, and brake system rise-time.

The data processing unit 160 may be operable to compute a brake threat number (BTN) defined by:

$$BTN = F_R / F_A$$

In a situation when the required braking force $F_R$ is greater than the braking force $F_A$ that the automobile 120 is capable of providing, the brake threat number BTN is greater than unity and the data processing unit 160 detects that a potential collision cannot be avoided solely by braking. The data processing unit 160 is then operable to automatically apply a braking force to one or more of the brake units 80 for crash mitigation, namely reducing a severity and likely damage resulting from a collision event.

Figure 9:
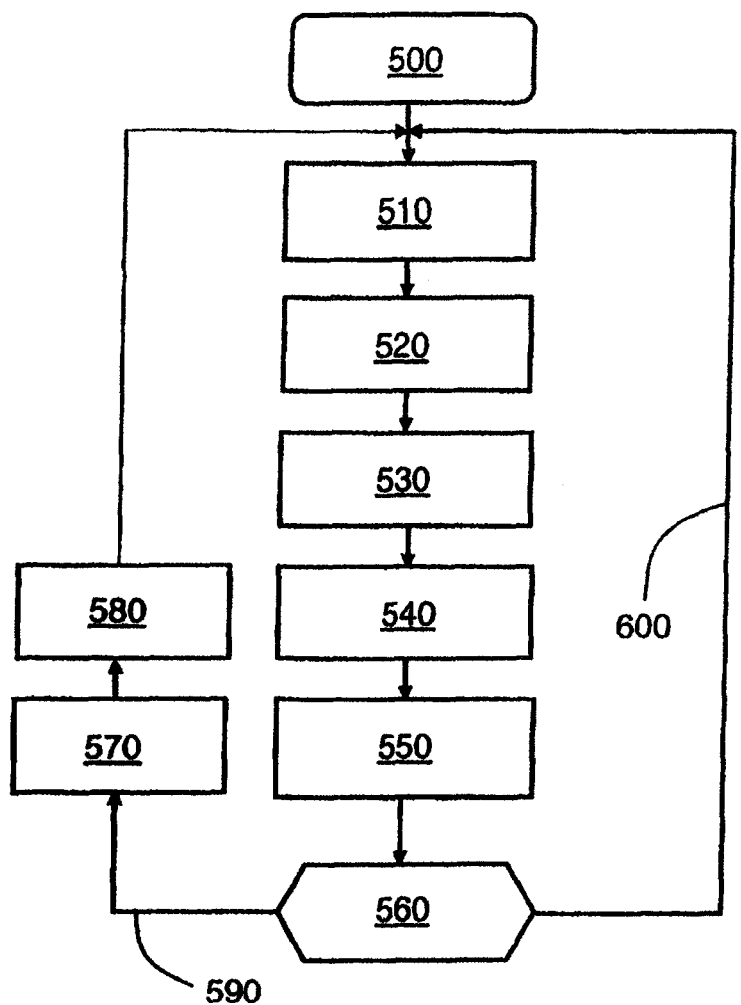
FIG. 9 is a flow chart of an algorithm executable in a data processing unit of the automatic steering and braking systems.

The foregoing described algorithm executed in the data processing unit 160 will now be further elucidated with reference to the flowchart of FIG. 9 along with the following descriptions:

Block/step 500: Start algorithm.

Block/step 510: Using the sensor arrangement 30, interrogate the region 40 to determine relative positions $(x_i, y_i)$ of i objects 230; also sense closing velocities $V_{CL}$; all sensed for time $t + \Delta t$.

Block/step 520: Compute trajectories of the i objects 230; derive image of objects from electro-optical sensor output to determine a spatial extension of the objects.

Block/step 530: Determine whether any object or group of objects is/are to be considered as a potentially hazardous object. An object is considered to be potentially hazardous if a future path of the host vehicle will pass through an object i having a spatial extension.

Block/step 540: Compute STN, including computing a steering torque $T_{REQ}$ required to be applied to the steering arrangement 70 to avoid a collision, and retrieving a value representative of a maximum torque available.

Block/step 550: Determine whether/how to intervene in dependence on the computed STN value. Possibilities include no intervention if STN is below a first threshold value, no intervention if steering torque required $T_{REQ}$ exceeds the maximum torque available, intervention if STN is above the first threshold value and the maximum torque available exceeds the steering torque required, that is STN<1. The magnitude of the steering torque applied is selected so as to avoid the potentially hazardous object with a small margin. The steering torque applied will therefore suitably amount to the steering torque required multiplied by a safety factor slightly greater than 1. The safety factor is suitably selected between 1.01 and 1.2, and more precisely between 1.05 and 1.15.

Block/step 560: In an optional step, check whether or not one or more of the i objects 230 are closer than the threshold distance $d_{R1}$ within the safest direction ($F_{lane}$); if the safest direction ($F_{lane}$) is occluded or likely to be occluded, proceed along a path 590 after an update time $\Delta t$: $t = t + \Delta t$. If no crash risk exists, proceed along a path 600.

Block/step 570: In an optional step, compute braking force required from signals from the sensor arrangement 30 (e.g. road surface conditions, precipitation) and autonomously apply braking force.

In a simplest implementation of the data processing unit 160, the algorithm is operable to consider the region 140 to be subdivided into left and right sectors. A direction in which the torque $T_{REQ}$ is directed is beneficially away from the sector of the region 140 which results in one or more of: the strongest return signal, a shortest distance to an object, and a fastest closing velocity relative to an object when interrogated by the sensor arrangement 130. More complex implementations are possible wherein the region 140 is subdivided into more than two sectors and signals from several types of sensors included in the sensor arrangement 130 are merged or fused. For example, a microwave radar sensor that may be included in the sensor arrangement is susceptible to providing a stronger signal from relatively smaller metallic objects than relatively larger concrete objects, whereas a lidar sensor that may be included in the sensor arrangement 130 is considerably affected by special types of optical coatings included on objects. Moreover, an optical video electro-optical sensor is susceptible to being influenced by strength of ambient light radiation in the region and color contrast of objects. Most reliably representative signals from the sensor arrangement 130 representative of objects are potentially obtained by merging or fusing signals generated from mutually different types of sensors included in the arrangement, for example a combination of lidar and microwave radar.

In the automobile 120, a warning is defined as being an audible, tactile or haptic warning which does not alter the path or trajectory of the automobile 120 without an appropriate response from the driver. Moreover, an intervention applied by the data processing unit 160 refers to an ability of the data processing unit 160 to directly affect a trajectory of the automobile 120. In the present collision avoidance and mitigation system, steering intervention has limited authority and is intended to augment commands from the driver. As elucidated earlier, the safest direction ($F_{lane}$) is defined as an area of roadway that the automobile 120 would be expected to travel in the absence of any obstruction, for example from the one or more objects 230. A lane departure is defined as a point in time when one of the front wheels of the automobile 120 is outside a corresponding lane boundary.

Figure 10:
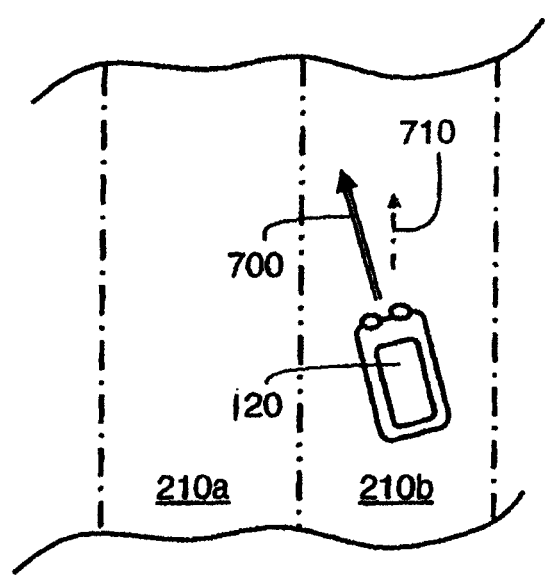
FIG. 10 is a first scenario in which a collision avoidance and mitigation system may be employed.

Various driving scenarios will now be described with reference to FIGS. 10 to 13 wherein the present collision avoidance and mitigation system is utilized to provide collision avoidance by steering. Referring to FIG. 10, there is shown the automobile 120 being driven along the lane 210b. In such a situation, the safest direction ($F_{lane}$) of the automobile 120 is straight ahead along the lane 210b; the safest direction ($F_{lane}$) is therefore defined by an arrow 710. The driver then causes the automobile 120 to change direction as denoted by an arrow 700. On account of their being no obstructing objects detected by the sensor arrangement 130 in conjunction with the data processing unit 160 in the changed direction 700, the data processing unit 160 interprets such a situation to be a bona fide maneuver by the driver such that the safest direction ($F_{lane}$) is interpreted by the data processing unit 160 to have changed from the direction 710 to the direction 700.

Figure 11:
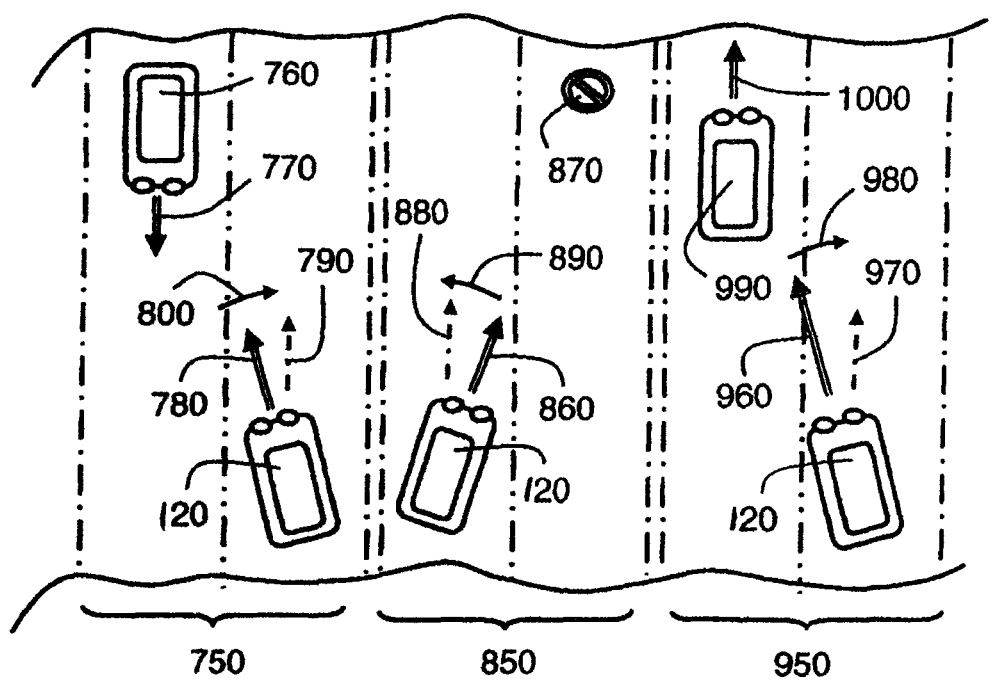
FIG. 11 is a second set of scenarios in which a collision avoidance and mitigation system may be employed.

Referring next to FIG. 11, there is shown more complex multi-lane road scenarios including three sections 750, 850, 950. In the section 750, the automobile 120 is traveling along its safest direction ($F_{lane}$) whose direction is denoted by an arrow 790 at a time t. At a time t+Δt, the driver causes the automobile 120 to turn in a left-hand direction denoted by an arrow 780 towards a vehicle 760 traveling in another direction denoted by an arrow 770. The data processing unit 160 in combination with the sensor arrangement 130 is operable to detect a presence of the vehicle 760 and also determine its direction of travel. The data processing unit 160 computes that the vehicle 760 could represent a collision hazard based on video electro-optical sensor information. However, the data processing unit 160 is also operable to compute that should the direction of the safest direction ($F_{lane}$) be updated to correspond to that of the direction 780, that the vehicle 760 with time will exit from the safest direction ($F_{lane}$) when assumed to be in the direction 780. In such a scenario, the vehicle 760 is correctly recognized not to be a considerable hazard and the data processing unit 160 is operable to applying a modest steering torque to the steering arrangement 170 to cause the automobile 120 to tend to steer slightly towards the right hand side as denoted by an arrow 800.

In the section 850, the automobile 120 at a time t is traveling in a direction denoted by an arrow 880 corresponding to its safest direction ($F_{lane}$) The driver of the automobile 120 then subsequently at a time t+Δt causes the automobile 120 to change direction denoted ay an arrow 860 in a direction of an object 870 which the data processing unit 160 in combination with the sensor arrangement 130 identifies is a stationary object and represents a collision hazard for the automobile 120. The data processing unit 160 is operable to determine that the safest direction ($F_{lane}$) in a direction of the arrow 880 is correct and that the driver of the automobile 120 is attempting a dangerous maneuver by steering into the direction 860. In consequence, the data processing unit 160 is operable to apply a relatively strong torque denoted by an arrow 890 via the steering arrangement to steer the automobile towards the original safest direction ($F_{lane}$) in the direction 880. The magnitude of the torque may be influenced by several factors, including: whether or not (or a probability that) the object 870 is capable of representing a collision hazard as identified from video information, thereby having a high Ki risk value; whether or not the object 870 is in a trajectory moving away from the direction 860 such that if the direction 860 were assumed to the updated safest direction ($F_{lane}$) at the time t+Δt, the object 870 would lie on the path of such an updated safest direction ($F_{lane}$) thereby representing an unacceptable risk situation; and whether or not the object 870 is stationary giving rise to a potentially high closing velocity $V_{CI}$ relative to the automobile 120.

In the section 950, the automobile 120 is at a time t traveling along its safest direction ($F_{lane}$) in a direction denoted by an arrow 970. The driver then causes the automobile 120 to change its direction of travel as denoted by an arrow 960 towards a vehicle 990 traveling in a direction 1000. The data processing unit 160 in combination with sensing arrangement 130 identifies the vehicle 990 to represent a collision hazard, but to be moving in a general direction substantially similar to that of the automobile 120, namely with a relatively low closing velocity $V_{CI}$. In such a situation, the data processing unit 160 causes the steering arrangement 170 to apply a more modest torque denoted by an arrow 980 to steer the automobile 120 back towards its original safest direction ($F_{lane}$) denoted by the arrow 970. However, if the vehicle 990 is sensed to be moving away from the automobile 120, the torque 980 would be corresponding less or substantially negligible.

Figure 12:
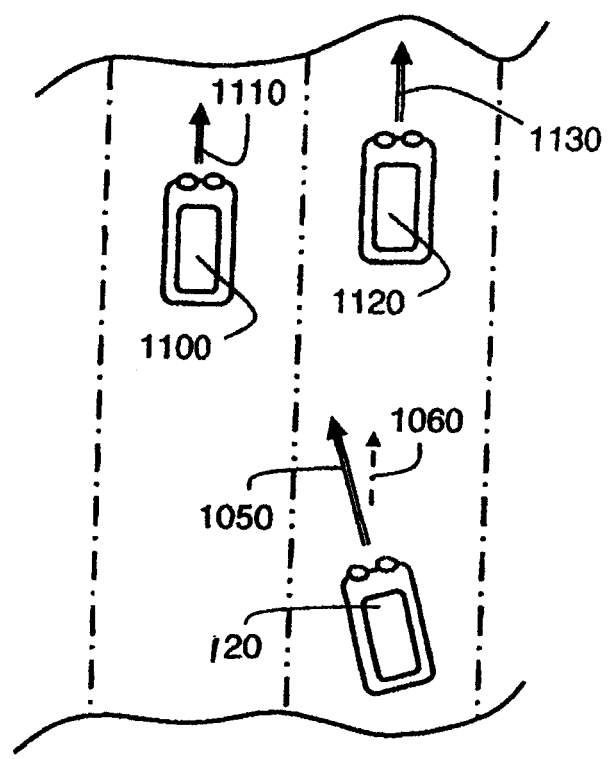
FIG. 12 is a third scenario in which a collision avoidance and mitigation system may be employed.

In FIG. 12, there is shown road situation which may be encountered on freeways. The automobile 120 at a time t is traveling in a direction denoted by an arrow 1060 defining a safest direction ($F_{lane}$) for the automobile 120. In front of the automobile 120 is a second vehicle 1120 traveling in a direction 1130 which is substantially in the same direction as the safest direction ($F_{lane}$) of the automobile 120. On account of the automobile 120 and the second vehicle 1120 having substantially zero relative closing velocity $V_{CI}$, the data processing unit 160 is operable to interpret the second vehicle 1120 as not being a collision risk to the automobile 20. The driver of the automobile 120 then decides to overtake the second vehicle 1120 and changes direction denoted by an arrow 1050 towards a first vehicle 1100 traveling in a direction denoted by an arrow 1110, this direction 1110 being substantially similar to the direction of travel 1130 of the second vehicle 1120.

In a situation wherein the first vehicle 1100 is traveling away from the automobile 120 faster than the second vehicle 1120, the data processing unit 160 in combination with the sensing arrangement 30 is operable to determine that the change of direction of travel of the automobile 120 as denoted by the arrow 1050 is a safe maneuver and subsequently at a time t+Δt updates its information regarding the safest direction ($F_{lane}$) of the automobile to correspond to a direction of the arrow 1050. However, in a situation wherein the first vehicle 1120 is traveling more slowly than the second vehicle 1120, the data processing unit 160 identifies the automobile 120 and the first vehicle 1100 to have a closing velocity $V_{CI}$ favoring the safest direction ($F_{lane}$) of the automobile 120 to remain along the direction 1060; in such a situation, the data processing unit 160 applies a torque via the steering arrangement 70 to urge the automobile towards the direction 1060. On account of the two vehicles 1100 and 1120 being substantially similar objects, their hazard ratings Ki will be mutually similar, as determined from video electro-optical sensor information provided to the data processing unit 60, hence determination of the safest direction ($F_{lane}$) is based on vehicle relative velocity information, for example closing velocity information.

Figure 13:
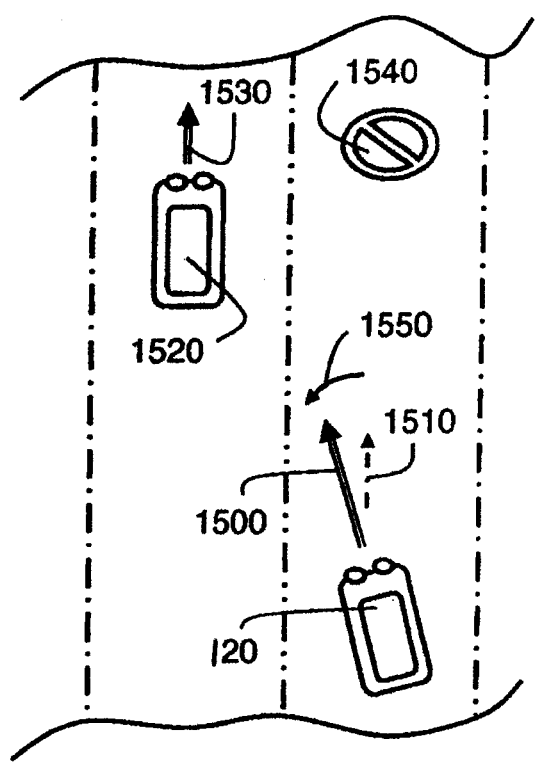
FIG. 13 is a fourth scenario in which a collision avoidance and mitigation system may be employed.

Referring next to FIG. 13, there is shown the automobile 120 traveling in a direction denoted by arrow 1510 defining a safest direction ($F_{lane}$) for the automobile 20. Directly ahead of the automobile 120 is a stationary object 1540, for example road works or an abandoned vehicle, and traveling in a left-hand lane is a moving vehicle 1520 traveling in a direction denoted by an arrow 1530 substantially parallel to the safest direction ($F_{lane}$) of the automobile 20. The data processing unit 60, by processing sensing signals output from the sensor arrangement 30, will identify that the object 1540 has a high closing velocity $V_{CI}$; relative to the automobile 120 in comparison to that of the vehicle 1520. The data processing unit 160 will in such a situation apply a strong torque in a left-hand direction as denoted by an arrow 1550 to steer the automobile 120 away from a collision with the stationary object 1540 towards the vehicle 1520 as denoted by an arrow 1500. The arrow 1500 thus defines an updated safest direction ($Fl_{ane}$) for the automobile 120 even despite the safest direction ($F_{lane}$) being now directed towards a vehicle.

In the examples shown in FIG. 10 to 13 and described in the foregoing, it will be appreciated that the data processing unit 160 is operable to apply a torque via the steering arrangement which is a complex function of several parameters. The complex function is represented in general form in the equation:

$$T_{REQ} = \psi\left[\sum_{i=1}^{n} ((x_i, y_i), q_i, t, V_{auto}, (v_{xi}, v_{yi}), F_l)\right]$$

-continued such that $$|T_{REQ}| = T_M \text{ when } T_{REQ} > T_M,$$

wherein:

$T_{REQ}$=torque to be applied to the steering arrangement 170 to avoid a collision;

$\psi$=a complex algorithm function implemented by the data processing unit 160;

I=an object identification index;

n=the total number of objects within the sensing region;

$V_{auto}$=the traveling velocity of the automobile 120;

$(v_{xi}, v_{yi})$=the velocity of the $i^{th}$ object relative to the automobile 120 as determined from multiple relative position computations derived from signals from the $i^{th}$ object;

$(x_i, y_i)$=the relative position of the $i^{th}$ object relative to the automobile 120; and $F_L$=the present direction of the safest direction ($F_{lane}$) of the automobile 120.

It will be appreciated that the complex function represented in the above equation is an example of signal processing performed in the data processing unit 160 operable to provide automatic steering characteristics as described, for example, with reference to FIGS. 10 to 13 but not limited thereto. Parameters employed in the equation can be varied depending upon steering characteristic desired. For example, road condition sensors can also input to the sensing arrangement 130 so that more conservative steering maneuvers are implemented by the data processing unit 160 when road conditions are slippery, for example in wet or icy conditions.

The sensing arrangement 130 can be further supplemented with sensors mounted at a rear of the automobile 120 to sense potential rear-end impact onto the automobile 120, for example to steer the automobile 120 away from a potential rear-end collision.

In the foregoing, it will be appreciated that autonomous steering is applied firstly by the processing unit in response to signals provided by the sensing arrangement 130. In an event of a steering maneuver not being able to avert a collision, the data processing unit 160 is operable to implement autonomous braking for crash avoidance or crash mitigation when the distance between the automobile and one or more objects 230 is less than $d_{R1}$, as depicted in FIG. 8.

The data processing unit 160 can be implemented such that autonomous steering to avoid collision as described in the foregoing is only active when the velocity $v_{auto}$ of the automobile 120 is above a lower threshold velocity, for example $v_{auto}$>65 km/h. Moreover, the such autonomous steering is optionally disabled when the velocity $v_{auto}$ is above an upper threshold velocity, for example $v_{auto}$>120 km/h. Such a limit is desirable in that 120 km/hour corresponds to approximately 40 meters/second in which case the sensing arrangement 30 with a range of 150 meters is only capable of sensing up to 5 seconds of travel of the automobile 120. Optionally, the data processing unit 160 is operable to cope with a road curvature radius of 250 meters or greater. Optionally, the data processing unit 160 can be configured to abort automatic steering intervention in a situation wherein a collision cannot be avoided so as to give the driver of the automobile 120 full control of the automobile.

According to a another aspect of the present invention, there is provided a method of applying a steering torque to a steering arrangement of an automobile in response to a potential collision event involving one or more potentially hazardous objects. Such a method may includes the steps of: Using a sensor arrangement 130 to interrogate a sensing region 140 external to the automobile 120 and generating corresponding sensor signals; receiving in a processing arrangement 160 the sensor signals and computing positions and relative velocities of one or more potentially hazardous objects 230 there from; computing a steering torque required to be applied to steer the automobile 120 in a direction to avoid the hazardous objects; computing a maximum torque available to steer the automobile 120 in the direction; comparing the maximum torque available with the steering torque required; and deciding how to intervene in response to the comparison.

In further embodiments, the following additional method steps may be performed alone or in combinations:

The collision avoidance and mitigation system may be prevented from applying steering torque in the event the steering torque required exceeds the maximum torque available to avoid the hazardous object;

The collision avoidance and mitigation may compute a ratio value representative of a ratio of the required steering torque to the maximum torque available;

The collision avoidance and mitigation system may be prevented from applying steering torque in the event the ratio value is below a first threshold value;

The collision avoidance and mitigation may intervene in the event the ratio value is above a first threshold value; and/or The collision avoidance and mitigation system may intervene by applying a steering torque in order to avoid the hazardous objects.

In further embodiments, the following method steps may be performed:

a) using a sensor arrangement to interrogate a sensing region external to the automobile and generating corresponding sensor signals;

b) receiving in a processing arrangement the sensor signals and computing positions and relative velocities of the one or more potentially hazardous objects in the sensing region there from, and computing there from a relatively safest direction ($F_{lane}$) in which the automobile is capable of traveling in operation with minimal risk of collision;

c) computing a steering torque required to be applied to steer the automobile in the safest direction ($F_{lane}$);

d) computing a maximum torque available to steer the automobile in the safest direction ($F_{lane}$);

e) computing a ratio value representative of a ratio of the required steering torque to the maximum torque available; and f) determining whether or not to intervene by applying steering torque to steer the automobile in the safest direction ($F_{lane}$) in response to the ratio value.

The method in step (a) above may include steps of: emitting radiation from a first sensor assembly towards the sensing region and receiving corresponding reflected radiation there from, and receiving imaging of the sensing region from a second electro-optical sensor assembly.

The method in step (b) above may also include steps of: associating in the processing arrangement sensed signals corresponding to the one or more potentially hazardous objects received from the first and second sensor assemblies, and associating a hazard risk (K) for each of the one or more potentially hazardous objects, and computing in the processing arrangement the portion of the safest direction ($F_{lane}$) which is potentially unobstructed as a function of the hazard risks of the one or more potentially hazardous objects.

According to a third aspect of the collision avoidance and mitigation system, there is provided a software product on a data carrier, the software product being executable on computing hardware to implement the method according to one of more of the methods described above.

The expression "automobile" is to be construed to include: personal motor vehicles, cars, fans, trucks, lorries, buses, motorcycles, scooters and any other type of propelled road vehicle.

Terms used in describing and claiming the present invention such as "include", "comprise", "consist of", "have", "are", "incorporate", are to be construed in a non-exclusive manner, namely to allow for other parts or components to be present which are not explicitly indicated While the best mode for carrying out the invention has been described in detail, those familiar with the art to which this invention relates will recognize various alternative designs and embodiments for practicing the invention as defined by the following claims.

The invention claimed is:

1. A collision course prediction system comprising: a sensor system installable in a host vehicle and transmitting at an operating frequency, the sensor system detecting a target object external to the host vehicle and determining at least an object position (x, y) and an object velocity ($\dot{x}$, $\dot{y}$) of the target object relative to the host vehicle;
    a time-to-collision estimator control block calculating an estimated time-to-collision $T_{ttc}$ based on a longitudinal distance (x), a longitudinal velocity ($\dot{x}$) and a longitudinal acceleration ($\ddot{x}$) of the target object relative to the host vehicle;
    a lateral distance estimator control block estimating a lateral distance (y) between respective centers of the host vehicle and the target object at the estimated time-to-collision $T_{ttc}$, the estimation based upon a distance r to the target object from the host vehicle and a target angle (alpha) between the heading direction of the host vehicle and the position of the target vehicle determined by the sensor system; and
    a collision course condition determination unit determining, at a determination instant t prior to the estimated time-to-collision $T_{ttc}$, a probability that the host vehicle will collide with the target object dependent at least in part upon whether the lateral distance is within a first interval, the first interval based on at least a lateral width of the host vehicle, a lateral width of the target object, and a target angle measurement error correction term Z2, the target angle measurement error correction term Z2 dependent on the distance r at the determination instant t and including a factor k* dependent upon a noise distribution of the sensor system in sensing the target angle (alpha) when transmitting at the operating frequency, wherein the correction term Z2 is determined as Z2=Z0+k*r, where Z0 is a constant.

2. A system according to claim 1, wherein the collision course condition determination unit further determines the probability that the host vehicle will collide with the target object dependent at least in part upon whether the estimated time-to-collision $T_{ttc}$ is within a time interval $T_{LC1} < T_{ttc} < T_{LC2}$, where $T_{LC1}$ is an estimated time for the host vehicle to enter a neighboring lane occupied by the target object and $T_{LC2}$ is an estimated time for the host vehicle to leave the neighboring lane.

3. A system according to claim 1, wherein the lateral distance estimator control block estimates the lateral distance ($y(T_{ttc})$) between respective centers of the host vehicle and target object at the estimated time-to-collision $T_{ttc}$ as $y(T_{ttc})=y(t)+\dot{y}(t) \cdot T_{ttc}+(\ddot{y}(t) \cdot T_{ttc}^2)/2$, where $\dot{y}(t)$ is a lateral velocity at the determination instant t and $\ddot{y}(t)$ is a lateral acceleration at the determination instant t.

4. A system according to claim 1, further comprising a collision avoidance/mitigation system comprising:
    a steering torque condition function block assessing whether a required steering torque applied to a steering arrangement of the host vehicle in order to avoid collision with the target object in a neighboring lane is within a steering torque range;
    a host lane threat condition functional block assessing whether a required braking force applied to a braking arrangement of the host vehicle to avoid an obstacle in a current lane occupied by the target vehicle is below a threshold braking force value;
    a timing condition functional block determining whether the estimated time-to-collision $T_{ttc}$ is below a threshold time value; and
    a data processing unit generating at least one of a steering intervention and a braking intervention if each of the following conditions are satisfied: a) the probability of collision determined by the collision course condition determination unit is sufficiently high, and b) the required steering torque is within the steering torque range, and c) the required braking force is below the threshold braking force value, and d) the estimated time-to-collision $T_{ttc}$ s below the threshold time value.

5. A method of predicting a probability that a host vehicle will collide with a target object comprising:
    operating a sensor system of the host vehicle to transmit at an operating frequency to detect the target object and determine at least a position (x, y) and a velocity ($\dot{x}$, $\dot{y}$) of the target object relative to the host vehicle;
    calculating an estimated time-to-collision $T_{ttc}$ based on a longitudinal distance (x), a longitudinal velocity ($\dot{x}$) and a longitudinal acceleration ($\ddot{x}$) of the target object relative to the host vehicle;
    estimating a lateral distance (y) between respective centers of the host vehicle and the target object at the estimated time-to-collision $T_{ttc}$, the estimation based upon a distance r to the target object from the host vehicle and a target angle (alpha) between the heading direction of the host vehicle and the position of the target vehicle determined by the sensor system; and
    determining, using a determination unit, at a determination instant t prior to the estimated time-to-collision $T_{ttc}$, the probability that the host vehicle will collide with the target object dependent at least in part upon whether the lateral distance is within a first interval, the first interval based on at least a lateral width of the host vehicle, a lateral width of the target object, and a target angle measurement error correction term Z2, the target angle measurement error correction term Z2 dependent on a distance r to the target object from the host vehicle at the determination instant t and including a factor k* dependent upon a noise distribution of the sensor system in sensing the target angle (alpha) when transmitting at the operating frequency, wherein the correction term Z2 is determined as Z2=Z0+k*r, where Z0 is a constant.

6. A method according to claim 5 wherein the step of determining the probability that the host vehicle will collide with the target object is further dependent at least in part upon whether the estimated time-to-collision $T_{ttc}$ is within a time interval $T_{LC1} < T_{ttc} < T_{LC2}$, where $T_{LC1}$ is an estimated time for the host vehicle to enter a neighboring lane occupied by the target object and $T_{LC2}$ is an estimated time for the host vehicle to leave the neighboring lane.

7. A method according to claim 5 wherein the step of estimating the lateral distance (y) comprises estimating a lateral distance ($y(T_{ttc})$) between respective centers of the host vehicle and target object at the estimated time-to-collision $T_{ttc}$ as $y(T_{ttc}) = y(t) + \dot{y}(t) \cdot T_{ttc} + (\ddot{y}(t) \cdot T_{ttc}^2)/2$, where $\dot{y}(t)$ is a lateral velocity at the determination instant t and $\ddot{y}(t)$ is a lateral acceleration at the determination instant t.

8. A collision avoidance/mitigation system assessing a risk that a host vehicle will collide with a threat object and generating an intervention in operation of the host vehicle if the risk is sufficiently high, the system comprising:
- a sensor system installable in a host vehicle, the sensor system detecting a target object external to the host vehicle by transmitting at an operating frequency and determining at least an object position (x, y) and an object velocity ($\{\text{dot over (x)}\}, \{\text{dot over (y)}\}$) of the target object relative to the host vehicle;
- a time-to-collision estimator control block calculating an estimated time-to-collision T.sub.ttc based on a longitudinal distance (x), a longitudinal velocity ($\{\text{dot over (x)}\}$) and a longitudinal acceleration ($\{\text{umlaut over (x)}\}$) of the target object relative to the host vehicle;
- a lateral distance estimator control block estimating a lateral distance (y) between respective centers of the host vehicle and the target object at the estimated time-to-collision T.sub.ttc; a collision course condition determination unit determining, at a determination instant t prior to the estimated time-to-collision T.sub.ttc, a probability that the host vehicle will collide with the target object dependent at least in part upon whether the lateral distance is within a first interval, the first interval based on at least a lateral width of the host vehicle and a lateral width of the target object and a target angle measurement error correction term Z2, the target angle measurement error correction term Z2 dependent on a distance r to the target object from the host vehicle at the determination instant t and including a factor k* dependent upon a noise distribution of the sensor system in sensing the target angle (alpha) when transmitting at the operating frequency, wherein the correction term Z2 is determined as Z2=Z0+k*r, where Z0 is a constant;
- a steering torque condition function block assessing whether a required steering torque applied to a steering arrangement of the host vehicle in order to avoid collision with the target object in a neighboring lane is within a steering torque range;
- a host lane threat condition functional block assessing whether a required braking force applied to a braking arrangement of the host vehicle to avoid an obstacle in a current lane occupied by the target vehicle is below a threshold braking force value;
- a timing condition functional block determining whether the estimated time-to-collision T.sub.ttc is below a threshold time value; and
- a data processing unit generating at least one of a steering intervention and a braking intervention if each of the following conditions are satisfied: a) the probability of collision determined by the collision course condition determination unit is sufficiently high, and b) the required steering torque is within the steering torque range, and c) the required braking force is below the threshold braking force value, and d) the estimated time-to-collision T.sub.ttc is below the threshold time value.

* * * * *